United States Patent
Takahashi et al.

(10) Patent No.: US 8,436,705 B2
(45) Date of Patent: May 7, 2013

(54) METHOD OF MAGNETIZING MAGNETIC ENCODER AND MAGNETIZING APPARATUS

(75) Inventors: Toru Takahashi, Iwata (JP); Shintarou Ueno, Iwata (JP); Pascal Desbiolles, Thorens-Glières (FR); Cyril Peterschmitt, Annecy (FR)

(73) Assignee: NTN Corporation, Osaka (JP)

( * ) Notice: Subject to any disclaimer, the term of this patent is extended or adjusted under 35 U.S.C. 154(b) by 4 days.

(21) Appl. No.: 13/138,357

(22) PCT Filed: Feb. 9, 2010

(86) PCT No.: PCT/JP2010/000789
§ 371 (c)(1), (2), (4) Date: Aug. 5, 2011

(87) PCT Pub. No.: WO2010/092799
PCT Pub. Date: Aug. 19, 2010

(65) Prior Publication Data
US 2011/0291780 A1    Dec. 1, 2011

(30) Foreign Application Priority Data
Feb. 10, 2009    (JP) ................................. 2009-028424

(51) Int. Cl.
*H01F 7/20*    (2006.01)
*H01F 13/00*    (2006.01)
*H01F 7/00*    (2006.01)

(52) U.S. Cl.
USPC ........................................... 335/284; 335/301

(58) Field of Classification Search .................. 335/284, 335/301
See application file for complete search history.

(56) References Cited

U.S. PATENT DOCUMENTS

| | | | | |
|---|---|---|---|---|
| 2,714,133 A | * | 7/1955 | Dodge | 360/134 |
| 2,849,683 A | * | 8/1958 | Miller | 333/1.1 |
| 3,428,305 A | * | 2/1969 | Bohn | 269/75 |
| 4,237,518 A | * | 12/1980 | Krulwich | 361/267 |
| 5,783,981 A | * | 7/1998 | Abboud et al. | 335/284 |
| 6,785,100 B2 | | 8/2004 | Hiramoto et al. | |
| 6,954,375 B2 | * | 10/2005 | Ohmori | 365/173 |

(Continued)

FOREIGN PATENT DOCUMENTS

| | | | |
|---|---|---|---|
| JP | 57202712 A | * | 12/1982 |
| JP | 01053512 A | * | 3/1989 |

(Continued)

OTHER PUBLICATIONS

International Search Report for PCT/JP2010/000789, Mailed May 18, 2010.

(Continued)

*Primary Examiner* — Mohamad Musleh (57) ABSTRACT

A magnetic encoder magnetizing method, in which magnetization of the plural neighboring tracks of the magnetic encoder can be accurately performed, is provided. While an annular magnetic body having a plurality of annular, unmagnetized magnetic encoder tracks integral therewith and juxtaposed relative to each other is rotated, the tracks of the magnetic encoder are individually magnetized by a magnetizing head, made up of a magnetizing yoke and an exciting coil, to thereby provide the magnetic encoder. In the practice of this magnetizing method, when one of the tracks of the magnetic encoder is magnetized, the other track is covered with a magnetic shielding mask.

13 Claims, 6 Drawing Sheets

U.S. PATENT DOCUMENTS

| | | | |
|---|---|---|---|
| 6,975,196 B1 * | 12/2005 | Laidlaw | 335/284 |
| 7,019,515 B2 * | 3/2006 | Sentoku | 324/207.25 |
| 7,508,193 B2 * | 3/2009 | Yarimizu et al. | 324/174 |
| 7,923,993 B2 | 4/2011 | Takahashi et al. | |
| 2002/0036872 A1 | 3/2002 | Hiramoto et al. | |
| 2006/0001514 A1 * | 1/2006 | Seno et al. | 335/284 |
| 2007/0046408 A1 * | 3/2007 | Shim | 335/296 |
| 2007/0182406 A1 * | 8/2007 | Yarimizu et al. | 324/207.25 |
| 2009/0021244 A1 * | 1/2009 | May | 324/207.2 |
| 2009/0315544 A1 | 12/2009 | Takahashi et al. | |

FOREIGN PATENT DOCUMENTS

| | | |
|---|---|---|
| JP | 02035703 A * | 2/1990 |
| JP | 2002-32904 | 1/2002 |
| JP | 2002-512687 | 4/2002 |
| JP | 2002-164213 | 6/2002 |
| JP | 2007-198847 | 8/2007 |
| JP | 4024472 | 10/2007 |
| JP | 2008-233069 | 10/2008 |
| WO | 98/45667 A1 | 10/1998 |

OTHER PUBLICATIONS

English Translation of the International Preliminary Report on Patentability mailed Sep. 22, 2011 in corresponding International Patent Application PCT/JP2010/000789.

* cited by examiner

Prior Art
Fig. 9B

METHOD OF MAGNETIZING MAGNETIC ENCODER AND MAGNETIZING APPARATUS

CROSS REFERENCE TO RELATED APPLICATIONS

This application claims the benefit under 35U.S.C. Section 371, of PCT International Application No. PCT/JP2010/000789, filed Feb. 9, 2010, which claimed priority to Japanese Application No. 2009-028424, filed Feb. 10, 2009, in the Japanese Patent Office, the disclosures of which are hereby incorporated by reference.

BACKGROUND OF THE INVENTION

1. Field of the Invention

The present invention relates to a method of magnetizing a multipolar magnetic annular body that is used as a magnetic encoder, used in detecting the rotation of various machines and equipments, or a rotor of a motor and also to a magnetizing apparatus used in the practice of such magnetization method.

2. Description of Related Art

This type of the magnetic encoder has been known, in which a plurality of neighboring tracks are each magnetized with magnetic N and S poles that alternate with each other in a direction circumferentially thereof. (See, for example, the Patent Documents 1 and 2 listed below.) The magnetic encoder disclosed in the Patent Document 1 is provided with a track for the detection of the rotational phase and another track for the detection of the position of origin. On the other hand, in the magnetic encoder disclosed in the Patent Document 2, a plurality of tracks having magnetic poles in which phases are displaced relative to each other are provided in neighboring relation to each other. The Patent Document 3 also listed below discloses positioning of two magnetic encoders, each having a single track, in neighboring relation to each other, in which the pitch between the magnetic poles in those tracks are differentiated from each other to enable the absolute angle to be detected. Also, the Patent Document 4 further listed below discloses a magnetizing technique in the manufacture of the magnetic encoder.

[Patent Document 1] JP Laid-open Patent Publication No. 2007-198847
[Patent Document 2] JP Published Int'l Application No. 2002-512687
[Patent Document 3] JP Laid-open Patent Publication No. 2008-233069
[Patent Document 4] JP Patent No. 4024472

SUMMARY OF THE INVENTION

It has, however, been found that where a plurality of tracks are arranged such as in the magnetic encoder disclosed in any one of the Patent Documents 1 and 3, there is a problem in that to manufacture a magnetic encoder having a single track and then to use after they have been arranged result in displacement in phase relation of the magnetic poles in the neighboring tracks. In order to avoid this problem, it is necessary to provide one annular magnetic body with a plurality of tracks integrally and then to magnetize each of those tracks.

However, if relative to the annular magnetic body having the plurality of the tracks integrally, such a magnetizing apparatus as disclosed in, for example, the Patent Document 4 is used to magnetize each of those tracks, there is such a problem that when one of those tracks is magnetized with the use of a magnetizing head, magnetic fluxes thereof may leak to the other tracks enough to worsen the magnetizing accuracy in the other tracks.

Figure 7:
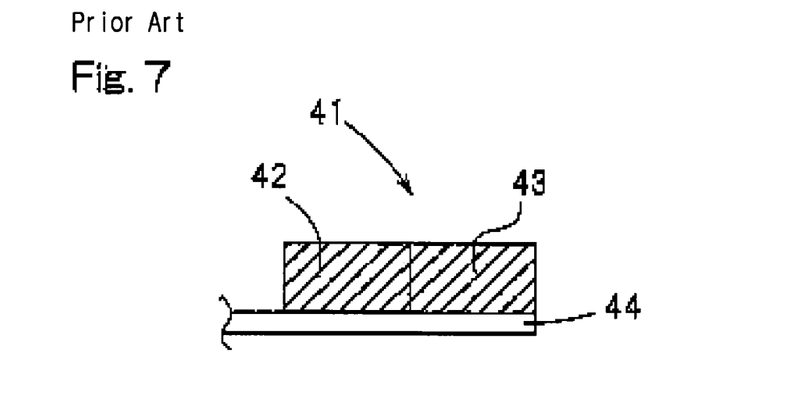
FIG. 7 is an explanatory diagram showing one example of the annular magnetic body to which the conventional magnetizing method for the magnetic encoder is applied.
Figure 8:
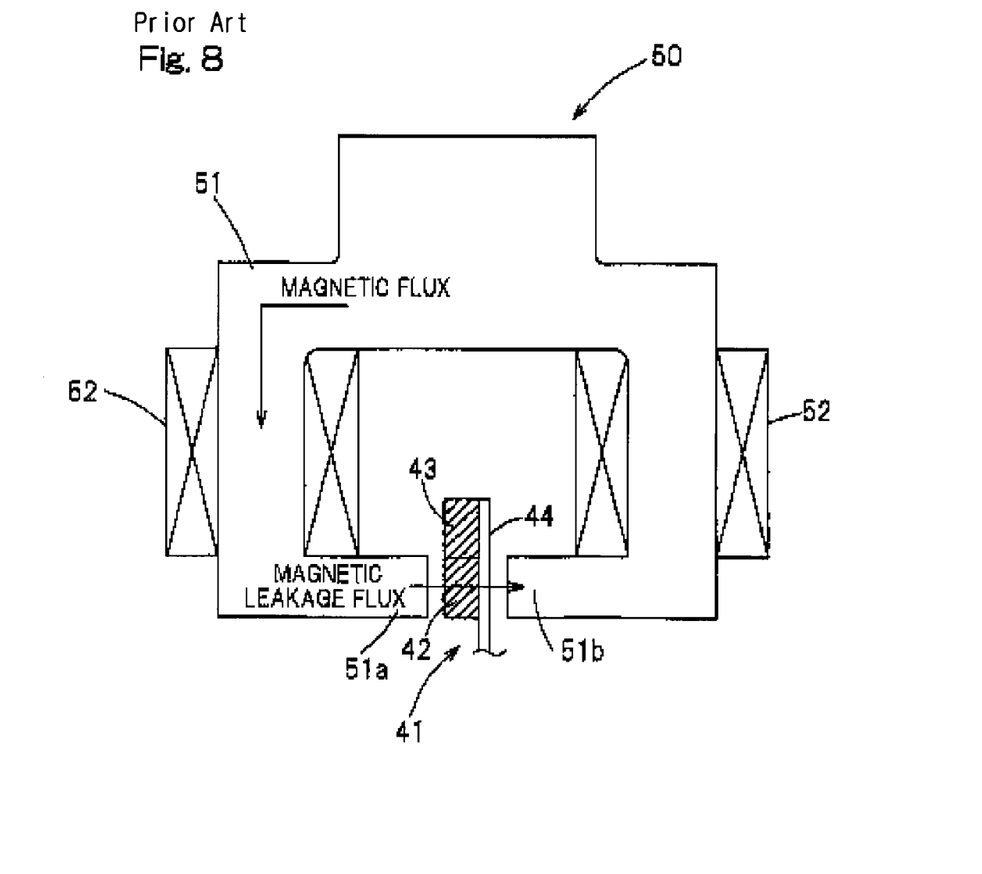
FIG. 8 is a structural diagram showing the magnetizing head employed in the practice of the conventional magnetizing method for the magnetic encoder.

The problem referred to above will now be detailed with particular reference to FIG. 7 to FIGS. 9A and 9B. As shown in FIG. 7, an annular magnetic body 41 in this case has not yet been magnetized and is of a type in which circumferentially extending annular magnetic encoder tracks 42 and 43 are coaxially provided on one of opposite surfaces of a cylindrical or disc shaped core metal in adjoining relation to each other. As shown in FIG. 8, a magnetizing head 50 is of a type in which an exciting coil 52 is wound around a magnetizing yoke 51, and the magnetizing yoke 51 has a pair of opposed end portions 51a and 51b confronting with each other with a magnetic gap intervening therebetween, wherefore when an exciting current is supplied to the exciting coil 52, magnetic fluxes are developed between the opposed end portions 51a and 51b. When the annular magnetic body 41 is positioned within the magnetic gap in the magnetic head 50 and one of the magnetic encoder tracks 42 (or 43) is positioned so as to be sandwiched between the opposed end portions 51a and 51b, the magnetic fluxes are developed to the magnetic encoder tracks 42 and 43 to thereby magnetize the magnetic encoder tracks 42 and 43.

Figure 9A:
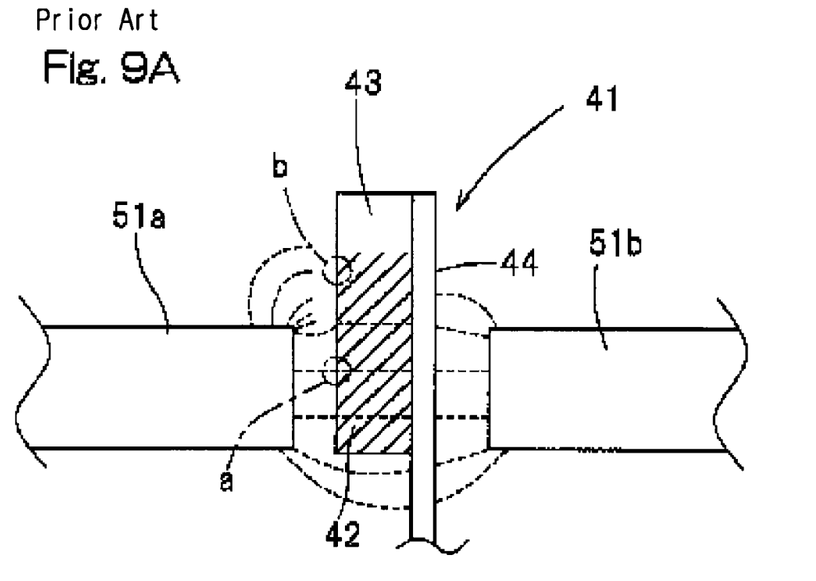
FIGS. 9A and 9B are explanatory diagram showing the conventional magnetizing method for the magnetic encoder.
Figure 9B:
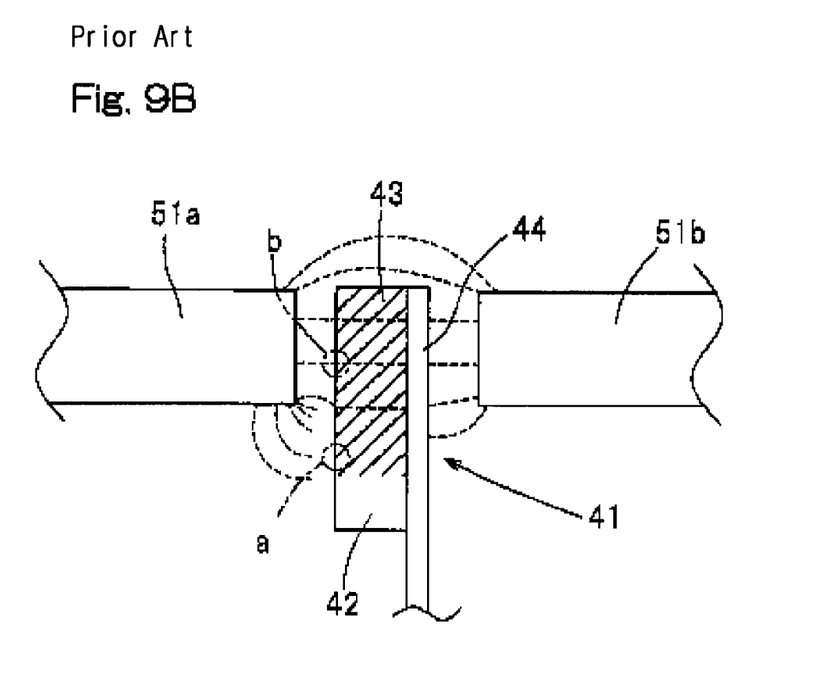

FIG. 9A illustrates the flow of the magnetic fluxes when the first magnetic encoder track 42 in the annular magnetic body 41 is desired to be magnetized to M magnetic pole pairs in a direction circumferentially of the magnetic encoder track 42 whereas FIG. 9B illustrates the flow of the magnetic fluxes when the second magnetic encoder track 43 in the annular magnetic body 41 is desired to be magnetized to N (M≠N) magnetic pole pairs in a direction circumferentially of the magnetic encoder track 43. In those figures, portions of the magnetic encoder tracks 42 and 43, which have been magnetized, are shown by the hatching and the magnetic fluxes developed are shown by the broken lines. At the outset, where as shown in FIG. 9A the first magnetic encoder track 42 is being magnetized with the M magnetic pole pairs, some of the magnetic fluxes leaks to the second magnetic encoder track 43 and, therefore the second magnetic encoder track 43 is also somewhat magnetized. In particular, a portion b of the second magnetic encoder track 43 proximate to the first magnetic encoder track 42 is apt to be affected by the magnetic leakage fluxes.

In the next place, where as shown in FIG. 9B the second magnetic encoder track 43 is being magnetized with the N magnetic pole pairs, that portion b of the second magnetic encoder track 43, which have been magnetized with the M magnetic pole pairs during the magnetization of the first magnetic encoder track 42, is overwritten with the N magnetic pole pairs. At this time, even at a portion a of the first magnetic encoder track 42 proximate to the second magnetic encoder track 43, the M magnetic pole pairs and the N magnetic pole pairs are mixed up in a manner similar to that described above. In this way, in those neighboring magnetic encoder tracks 42 and 43, the accuracy of magnetization at a location of one of the first and second magnetic encoder tracks adjacent to the other of the first and second magnetic encoder tracks tends to be worsened.

An object of the present invention is to provide a magnetic encoder magnetizing method and a magnetizing apparatus, in which magnetization of the plural neighboring tracks of the magnetic encoder can be accurately performed without adversely affecting the next adjacent magnetic encoder track or tracks.

A magnetizing method for a magnetic encoder, which is devised in accordance with the present invention, is a method for magnetizing a magnetic encoder, in which while an annular magnetic encoder body having a plurality of annular, unmagnetized magnetic encoder tracks integral therewith and juxtaposed relative to each other is rotated, those tracks of the magnetic encoder are individually magnetized by a magnetizing head, having a magnetizing yoke and an exciting coil, to thereby provide the magnetic encoder, the method including covering when one of the tracks of the magnetic encoder is magnetized, the other track is covered with a magnetic shielding mask.

According to the magnetic encoder magnetizing method of the kind referred to above, since one of the magnetic encoder tracks is covered with a magnetic shielding mask when the other track of the magnetic encoder tracks is being magnetized, magnetization of the neighboring tracks to be magnetized can be performed accurately.

In the present invention, the magnetic shielding mask is preferably made of a ferromagnetic material, which has high magnetic permeability. Since a magnetic field flows across the magnetic shielding mask, the magnetic encoder track desired to be protected can be effectively shielded.

In the present invention, the magnetic shielding mask may be made of an electric conductor of a non-magnetic material. Since a magnetic field developed by a pulse current is counterbalanced by an eddy current generated in the conductor and will not therefore pass, the magnetic encoder track desired to be protected can be effectively shielded.

In the present invention, the magnetic shielding mask may be of a structure made up of a layer of a ferromagnetic material, which has high magnetic permeability, and a layer of an electric conductor. By the effect that the magnetic field flows across the magnetic shielding mask and the effect brought about by the eddy current, the magnetic encoder track desired to be protected can be effectively shielded.

In the present invention, the magnetic shielding mask may be an annular body for covering the other track in its entirely. If the magnetic shielding mask is the annular body covering the other magnetic encoder track entirely, no labor of moving the magnetic shielding mask each time a portion of the magnetic encoder track to be magnetized changes, when each of the portions of the track is magnetized with a pair of poles successively, and, therefore, the magnetization can be facilitated.

In the present invention, the annular magnetic body may be of a structure, in which the plural tracks of the magnetic encoder are formed in one of opposite surfaces of an annular core metal and the magnetic shielding mask has a portion arranged in neighboring or proximate to the annular core metal.

If in the magnetization, the magnetic shielding mask made of the magnetic material is arranged with a portion thereof held in proximity to the core metal on the annular magnetic body, the magnetic resistance between the magnetic material, used for covering purpose, and the core metal can be reduced and, therefore, leakage fluxes can readily pass across the magnetic shielding mask, thereby effectively avoiding the leakage fluxes leaking to the magnetic encoder track which is not an object to be magnetized.

In the present invention, of the plural tracks of the magnetic encoder, at least one of the tracks of the magnetic encoder may be rendered to be a rotation detecting track by being magnetized with different magnetic poles alternately at an equal pitch.

In the present invention, of the plural tracks of the magnetic encoder, a different track from the rotation detecting track may be used as a Z phase signal generating track by magnetizing the different track with magnetic poles for a rotational reference position detection at one location or a plurality of locations on a circumference of such track.

In the present invention, of the plural tracks of the magnetic encoder, a different track from the rotation detecting track may be used as another rotation detecting track by magnetizing the different track with different magnetic poles alternately at an equal pitch in a number different from the number of the magnetic poles in the rotation detecting track.

In the present invention, of the plural tracks of the magnetic encoder, a different track from the rotation detecting track may be used as another rotation detecting track by magnetizing the different track with different magnetic poles alternately at an equal pitch in a number equal to the number of the magnetic poles in the rotation detecting track, but displaced in phase from the magnetic poles in the rotation detecting track.

In the present invention, a magnetic spacer may be arranged between the neighboring tracks of the magnetic encoder in the annular magnetic body. Arrangement of the magnetic spacer in this way is effective to allow magnetic fluxes flows from the magnetizing yoke to be concentrated on the magnetic spacer and the core metal and, therefore, leakage of the magnetic fluxes to the magnetic encoder track, which is not an object to be magnetized, can be avoided effectively.

In the present invention, the annular magnetic body may have the neighboring tracks of the magnetic encoder formed on one of opposite side surfaces of an annular core metal and a bent spacer may then be interposed between the neighboring tracks of the magnetic encoder, which bent spacer is bent to protrude towards one of the opposite side surface of the annular core metal. If a bent portion formed by bending the core metal to provide the bent spacer is used in place of the magnetic spacer referred to above, leakage of the magnetic fluxes to the magnetic encoder track which is not an object to be magnetized can be avoided effectively and the number of component parts can also be reduced advantageously.

A magnetizing method for a multipolar magnetic annular body designed in accordance with the present invention, is a method in which while the multipolar magnetic annular body having, integral therewith, a plurality of annular tracks to be magnetized and juxtaposed relative to each other is rotated, those tracks to be magnetized are individually magnetized by a magnetizing head, having a magnetizing yoke and an exciting coil, to thereby provide a multipole magnetized annular body, the method including covering, when one of the tracks to be magnetized is magnetized, the other track is covered by a magnetic shielding mask. The multipolar annular magnetized annular body referred to above may be a magnetic encoder or a rotor for a motor. According to this construction, since when one of the plural tracks to be magnetized is being magnetized, the other track is covered with a magnetic shielding mask, magnetization of the neighboring tracks to be magnetized can be performed precisely. Even in the motor rotor, in the event that the necessity arises that the tracks to be magnetized are desired to be provided in a plurality of tracks and different forms of magnetization such as, for example, the different pitch of the magnetic poles between the neighboring the tracks and the different phases of the magnetic poles between the neighboring tracks are desired, an effect of highly accurate magnetization effective to avoid any influence on the next adjacent track can be accomplished and exhibited effectively. In the case where the multipolar magnetic annular body is a magnetic encoder, the above described tracks to be magnetized are the magnetic encoder tracks referred to previously.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A preferred embodiment of the present invention will now be described with particular reference to FIGS. 1A and 1B to FIGS. 6A to 6D. A magnetizing method for a magnetic encoder in accordance with the preferred embodiment of the present invention is such that the magnetic encoder, which is a multipole magnetized annular body, is formed by rotating an annular unmagnetized magnetic body 1 integrally having a plurality of neighboring tracks 2 and 3 (for example, two tracks, in the instance as shown) of annular magnetic encoder and then by individually magnetizing the neighboring magnetic encoder tracks 2 and 3 with the use of a magnetizing head 10 (shown in FIG. 3) while the annular magnetic body 1 is rotated.

Figure 2A:
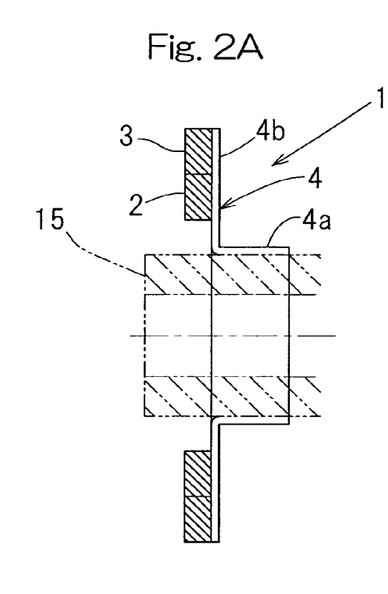
FIGS. 2A and 2B are explanatory diagrams showing different types of annular magnetic bodies to which the magnetizing method of the present invention is applied.

In such case, the annular magnetic body 1 is of a type in which the two neighboring magnetic encoder tracks 2 and 3, each of which extends in a direction circumferentially of the annular magnetic body 1, are defined in a surface of a core metal 4 of a disc shaped configuration or a cylindrical configuration in a side-by-side relation and mutually neighboring relation to each other. The annular magnetic body 1 having the disc shaped core metal 4 is of an axial type having a L-sectioned configuration and including a cylindrical wall portion 4a and a disc shaped upright wall portion 4b protruding radially outwardly from one end of the cylindrical wall portion 4a. The two magnetic encoder tracks 2 and 3 are defined in one of opposite annular faces of the upright wall portion 4b in coaxial relation with the core metal 4 in a fashion adjoining in a direction radially of the upright wall portion 4b as shown in, for example, FIG. 2A. The magnetic encoder that can be obtained when the axial type annular magnetic body 1 is magnetized is press mounted on an outer diametric surface of, for example, a bearing rotatable ring 15 shown by the phantom line, with the cylindrical wall portion 4a of the core metal 4 press fitted onto such bearing rotatable ring 15.

Figure 2B:
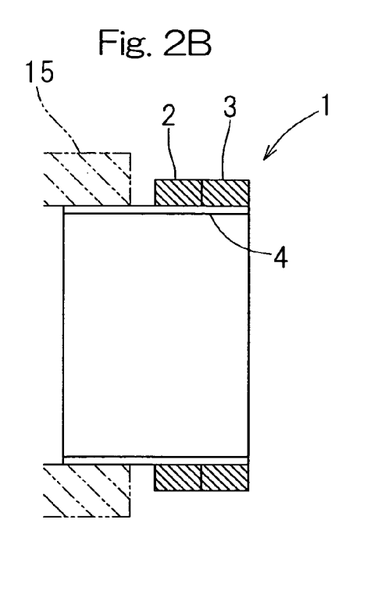

The annular magnetic body 1 having the cylindrical core metal 4 is of a radial type in which the two magnetic encoder tracks 2 and 3 of the same dimensions are defined on the outer diametric surface of the core metal 4 in a fashion adjoining to each other in a direction axially of the core metal 4 as shown in, for example, FIG. 2B. The magnetic encoder that can be obtained when the radial type annular magnetic body 1 is magnetized is mounted on an inner diametric surface of the bearing rotatable ring 15, shown by the phantom line, under interference fit. The magnetic encoder tracks 2 and 3 are, for example, rubber containing a magnetic powder, plastics or sintered element and will become a rubber magnet, a plastic magnet or a sintered magnet when magnetized.

Figure 3:
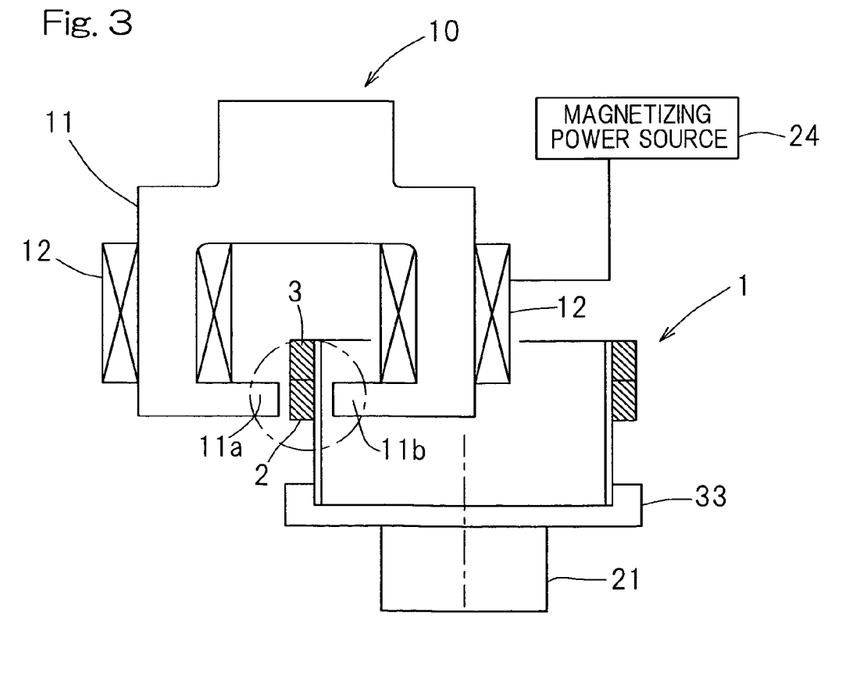
FIG. 3 is a structural diagram showing a magnetizing head employed in the practice of the magnetizing method.

Referring now to FIG. 3, the magnetizing head 10 is of a type, in which an exciting coil 12 is wound around a magnetizing yoke 11, and the magnetizing yoke 11 includes a pair of opposed end portions 11a and 11b spaced a distance from each other with a magnetic gap defined therebetween such that when an electric exciting current is supplied from a magnetizing power source 24 across the exciting coil 12 magnetic fluxes are developed between the opposed end portions 11a and 11b. While the annular magnetic body 1 is positioned within the magnetic gap of the magnetizing head 10 with one of tracks 2 or 3 of the magnetic encoder (the encoder track 2 in the instance as shown) sandwiched between the opposed end portions 11a and 11b, development of the magnetic fluxes across the magnetic encoder track 2 or 3 results in magnetization of such magnetic encoder track 2 or 3. In such case, when while the annular magnetic body 1 is supported by a chuck 33 provided in, for example, a spindle device 21, the spindle device is indexedly rotated, magnetic N and S poles can be alternately magnetized to the magnetic encoder track 2 or 3 in a direction circumferentially thereof.

Figure 1A:
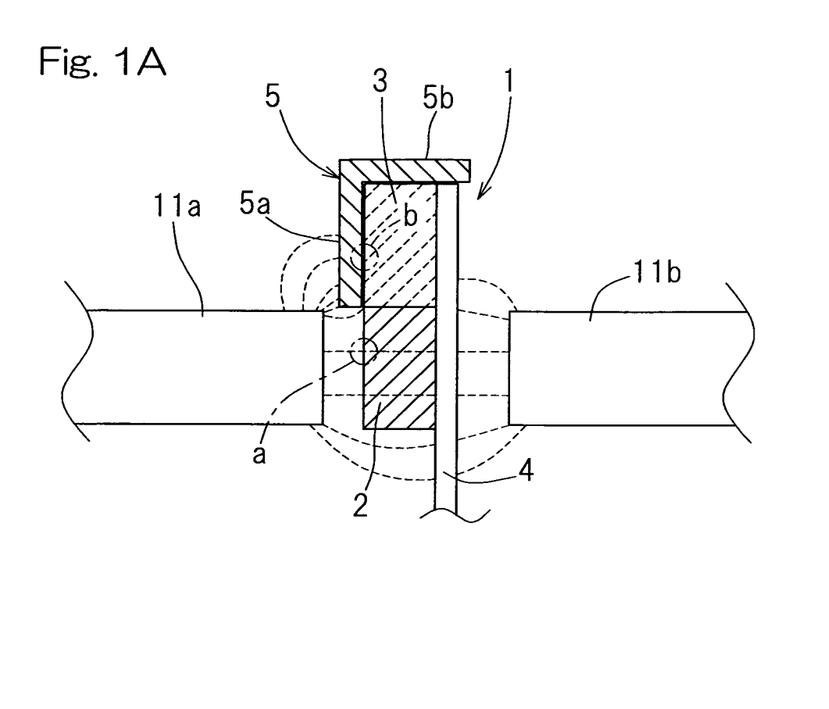
FIGS. 1A and 1B are explanatory diagrams showing a method of magnetizing a magnetic encoder in accordance with the present invention, respectively.
Figure 1B:
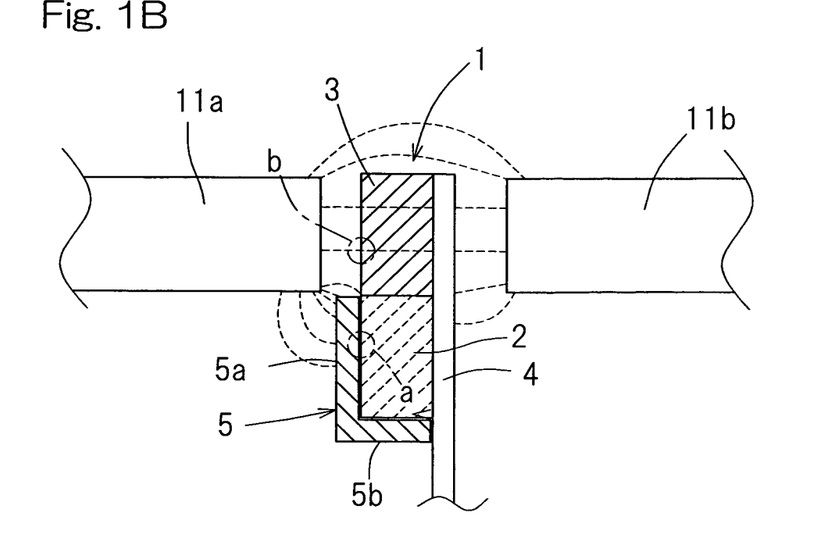

FIG. 1A illustrates the fluxes developed by the magnetizing method, discussed above, in a direction circumferentially of the first magnetic encoder track 2 of the annular magnetic body 1 in the case where a plurality of, for example, M, magnetic pole pairs (each pair comprised of a magnetic N pole and a magnetic S pole) whereas FIG. 1B illustrates the fluxes developed by the magnetizing method, discussed above, in a direction circumferentially of the second magnetic encoder track 3 of the annular magnetic body 1 in the case where a plurality of, for example, N, magnetic pole pairs, in which M and N represent respective integers each representing the number of the magnetic pole pairs but being of a value different from each other (i.e., M N). In each of those figures, a portion of the first or second magnetic tracks 2 or 3, which has been magnetized, is indicated by the hatching and the fluxes are indicated by the broken lines. At the outset, when one of the double tracks 2 and 3 the magnetic encoder is desired to be magnetized with the M magnetic pole pairs, for example, the first magnetic encoder track 2 as shown in FIG. 1A, the other track of the magnetic encoder, that is, the second magnetic encoder track 3 are shielded with a magnetic shielding mask 5 made of a ferromagnetic material. The magnetic shielding mask 5 is rendered to be an annular magnetic member of an L-sectioned configuration including a front surface confronting portion 5a, which confronts a front surface of the magnetic encoder track 2 (or 3), and a side surface confronting portion 5b, which is bent from one end of the front surface confronting portion 5a so as to confront one side surface of the magnetic encoder track 2 (or 3). The front surface confronting portion 5a and the side surface confronting portion 5b cooperate with each other to shield the track of the magnetic encoder. This magnetic shielding mask 5 is so arranged as to permit one end thereof, that is, the side surface confronting portion 5b thereof to assume a position proximate to the core metal 4 on the annular magnetic body 1.

When with the magnetic shielding mask 5 placed in the way as described above, an electric exciting current is supplied across the exciting coil 12 of the magnetizing head 1, the magnetic fluxes are developed across the first magnetic encoder track 2 of the annular magnetic body 1 to thereby magnetize the first magnetic encoder track 2. At this time, the entire second magnetic track 3, which is not an object to be magnetized, are magnetically shielded with the magnetic shielding mask 5 and, therefore, the second magnetic encoder track 3 can be prevented from being magnetized by magnetic leakage fluxes. Even a portion b of the second magnetic encoder track 3 in the close vicinity of the first magnetic encoder track 2 will never be undesirably magnetized.

In the next time, when the second magnetic encoder track 3 as shown in FIG. 1B is desired to be magnetized with the N magnetic pole pairs, the other track of the magnetic encoder, that is, the first magnetic encoder track 2 is shielded with the magnetic shielding mask 5. At this time, the magnetic shielding mask 5 is so arranged as to permit one end thereof, that is, the side surface confronting portion 5b thereof to assume a position proximate to the core metal 4 on the annular magnetic body 1. Even in this case, the entire first magnetic track 2, which is not an object to be magnetized, is magnetically shielded with the magnetic shielding mask 5 and, therefore, the first magnetic encoder track 2 already magnetized with the M magnetic pole pairs, can be prevented from being overwritten with the N magnetic pole pairs due to the magnetic leakage fluxes. Also even a portion a of the first magnetic encoder track 2 in the close vicinity of the second magnetic encoder track 3 will never be undesirably magnetized.

As hereinabove described, according to the above described method of magnetizing the magnetic encoder, when one of first and second tracks 2 and 3 of the magnetic encoder is magnetized, the other of the first and second magnetic encoder tracks 2 and 3 is shielded with the magnetic shielding mask 5, magnetization of the plurality of the tracks 2 and 3 to be magnetized, which are neighboring to each other, can be accomplished precisely and accurately.

According to the embodiment of the present invention described hereinabove, the magnetic shielding mask 5 is so designed and so configured as to be an the annular member of a size and a shape enough to cover each entire track 2 or 3 of the magnetic encoder and, therefore, when the magnetic pole pairs are to be sequentially magnetized, no labor is required to shift the magnetic shielding mask 5 each time the magnetic encoder track to be magnetized changes, thus facilitating the magnetization.

Also, since the magnetic shielding mask 5 includes the front surface confronting portion 5a, which confronts the front surface of the magnetic encoder track 2 (or 3), and the side surface confronting portion 5b, which is bent from one end of the front surface confronting portion 5a so as to confront one side surface of the magnetic encoder track 2 (or 3), the front surface confronting portion 5a and the side surface confronting portion 5b cooperate with each other to shield the entire track of the magnetic encoder and is so arranged as to permit one end thereof, that is, the side surface confronting portion 5b thereof to assume that position proximate to the core metal 4 on the annular magnetic body 1 during the magnetization, the magnetic resistance between the magnetic shielding mask 5 and the core metal 4 can be advantageously reduced to allow the magnetic leakage fluxes to pass through the magnetic shielding mask 5 and, hence, the magnetic leakage fluxes can be effectively avoided from reaching the magnetic encoder track 3 (or 2) which is not an object to be magnetized.

Figure 4:
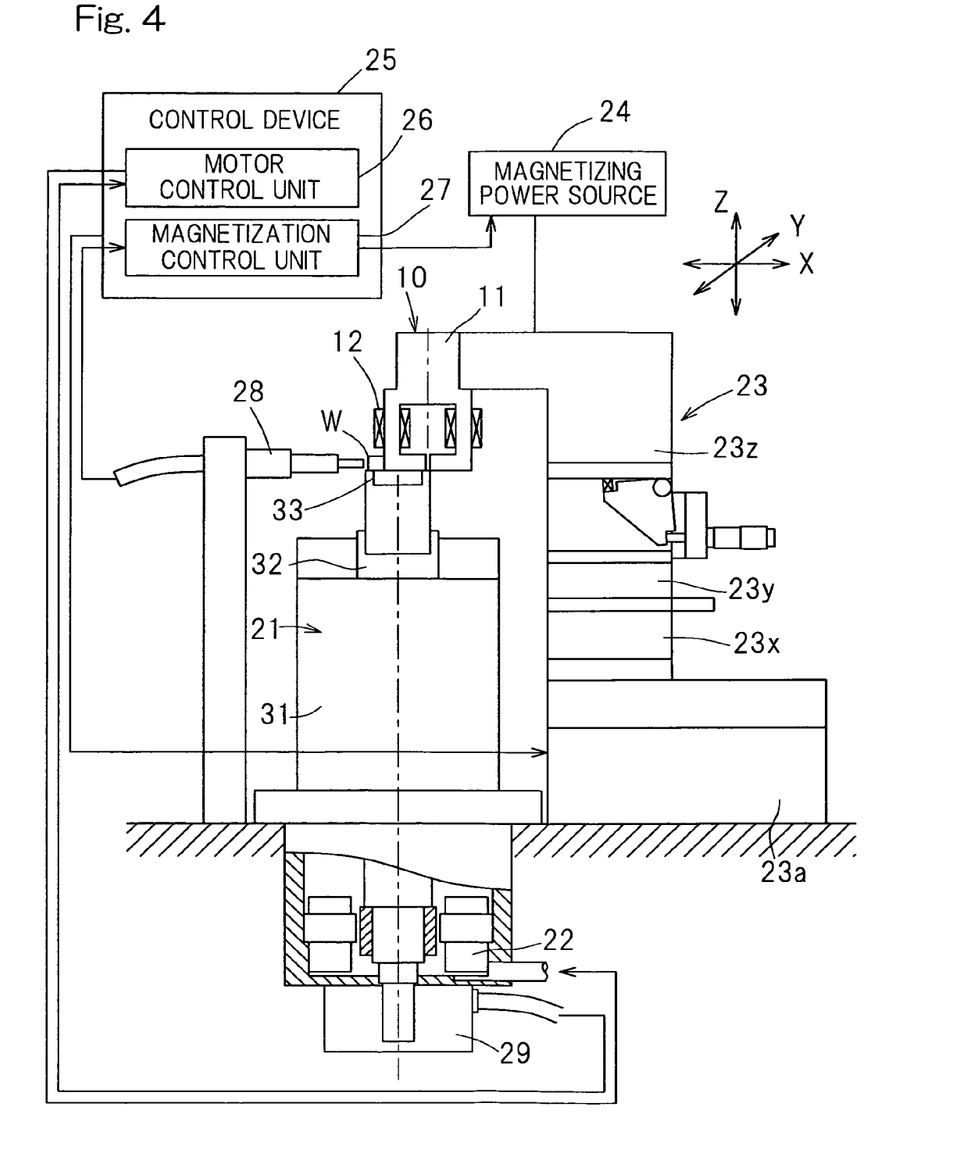
FIG. 4 is a schematic structural diagram showing the magnetizing apparatus for magnetizing the magnetic encoder, in which the magnetizing method referred to above is employed.

FIG. 4 illustrates one example of the magnetizing apparatus used in the practice of the method of magnetizing the magnetic encoder of the kind described hereinabove. The illustrated magnetizing apparatus includes a spindle device 21 for holding and rotating the previously described annular magnetic body 1 which forms an object to be magnetized, a drive motor 22 for the rotator drive thereof, a magnetizing head 10, a positioning device 23 for positioning the magnetizing head 10 in three axis directions perpendicular to each other, a magnetizing power source 24, the magnetic shielding mask 5 of the kind described hereinabove, and a control device 25. The drive motor 22 is rendered to be of a type equipped with the encoder 29.

The spindle device 21 is of a design in which a main shaft 32 is rotatably supported within a housing 31, and the main shaft 32 has a free end on which a chuck 33 for holding the annular magnetic body 1 in a coaxial relation with the main shaft 32 is mounted. This spindle device 21 is preferably of a type having a minimized fluctuation in rotation and a minimized speed variation and excellent in indexing accuracy and may therefore be employed in the form of, for example, a static gas bearing spindle device of a type capable of rotatably supporting the main shaft 32 by means of static gas bearings (not shown). The chuck 33 is rendered to be of a type capable of holding, for example, the radial type annular magnetic body 1 from inner and outer peripheral surfaces thereof.

The positioning device 23 positions the magnetizing head 10 in three axis directions (X-axis, Y-axis and Z-axis directions) perpendicular to each other and is employed in the form of, for example, a so-called XYZ table. This positioning device 23 includes an X-axis table 23x mounted on a stationary bench 23a for movement in a forward and rearward direction (X-axis direction), a Y-axis table 23y mounted on the X-axis table 23x for movement in a leftward and rightward direction (Y-axis direction), and a Z-axis table 23z mounted on the Y-axis table 23y for movement in an up and down direction (Z-axis direction) with the magnetizing head 10 mounted on such Z-axis table 23z. Each of the tables 23x, 23y and 23z is driven by a respective drive source (not shown) such as, for example, a servomotor.

As best shown in FIG. 4, the magnetizing power source 24 applies an electric magnetizing current to the exciting coil 12 on the magnetizing yoke 11. This magnetizing power source 24 makes use of an N pole power source for applying an electric current necessary to magnetize the annular magnetic body 1 to magnetic N poles and an S pole power source for applying an electric current necessary to magnetize the annular magnetic body 1 to magnetic S poles, and may also make use of a switching unit for selectively connecting one of the N and S pole power sources with the exciting coil 12. Accordingly, separate adjustment of magnetizing intensities of the magnetic N and S poles can be facilitated. The control device 25 controls the magnetizing power source 24, the spindle device 21, the positioning device 23 and the drive motor 22. This control device 25 includes a motor control unit 26 for controlling the rotation of the drive motor 22 and a magnetization control unit 27 for controlling the magnetizing current (exciting current). The motor control unit 26 is so designed and so configured as to detect the rotational speed and the position of origin of the drive motor 22 by means of an encoder 29 to provide a detected speed signal indicative of the rotational speed and then to control the rotational speed of the drive motor 22 in response to such detected speed signal. The magnetization control unit 27 is so designed and so configured as to detect the magnetizing intensity of each of the magnetic N and S poles then magnetized to provide a detected intensity signal indicative of the magnetizing intensity and then to control the intensity of the magnetizing current in response to such detected intensity signal.

Hereinafter, the operation of the magnetizing apparatus of the structure described above will be summarized. While the annular magnetic body 1 is held and then rotated by the spindle device 21, the magnetic fluxes are developed as shown in FIG. 1A or 1B to magnetize the annular magnetic body 1 by means of the magnetizing yoke 11 then confronting front and rear faces of one of the tracks of the magnetic encoder, for example, the first magnetic track 2 (or the second magnetic track 3) in the annular magnetic body 1. At this time, with the supply of the magnetizing current being switched on or off and the direction of flow of the magnetizing current being changed, the magnetic encoder track 2 (or 3) can be sequentially magnetized to the magnetic N and S poles that alternate with each other in a direction circumferentially of the annular magnetic body 1, thereby accomplishing a multipolar magnetization.

With the magnetizing apparatus of the structure described hereinbefore, not only the previously described magnetizing method for magnetizing the magnetic encoder can be readily performed, but also magnetization to the plural tracks neighboring or adjoining to each other can be accomplished accurately.

Figure 5A:
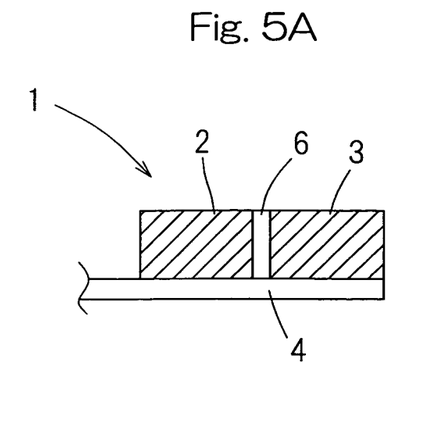
FIGS. 5A and 5B are explanatory diagrams showing different structural examples of annular magnetic bodies to which the magnetizing method is applied.

FIGS. 5A and 5B illustrate alternate structural examples of the annular magnetic body 1. In the structural example shown in FIG. 5A, a magnetic spacer 6, made of a magnetic material, is disposed between the magnetic encoder tracks 2 and 3 neighboring or adjacent to each other. Intervention of the magnetic spacer 6 is effective to allow magnetic fluxes leaking from the magnetizing yoke 11 to be concentrated on the magnetic spacer 6 and the core metal 4 and, accordingly, an undesirable leakage of the fluxes to the magnetic encoder track 2 (or 3), which is then not an object to be magnetized, can be avoided effectively.

Figure 5B:
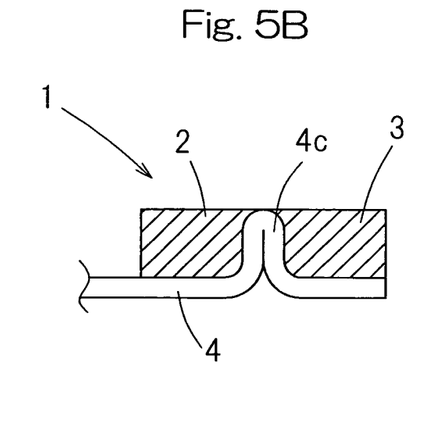

In the structural example shown in FIG. 5B, the core metal 4 is bent to protrude radially outwardly to define a bent spacer 4c with respective side faces of the magnetic encoder tracks 2 and 3 positioned in contact with the bent spacer 4c. The use of the bent spacer 4c, formed by bending the core metal 4, in place of the magnetic spacer 6 shown in FIG. 5A is similarly effective to avoid the magnetic fluxes from leaking to the magnetic encoder track 2 (or 3), which is not an object to be magnetized, and is additionally effective for reduction of the number of component parts used.

Figure 6A:
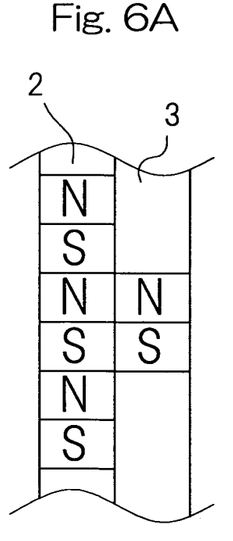
FIGS. 6A to 6D are explanatory diagram showing various patterns of magnetic poles which can be applied in accordance with the magnetizing method referred to above.

FIGS. 6A to 6D illustrates different patterns of the magnetic N and S poles magnetized to each of the first and second magnetic encoder tracks 2 and 3 on the annular magnetic body 1. The magnetization pattern shown in FIG. 6A is such that one of the magnetic encoder tracks, for example, the first magnetic encoder track 2 has the magnetic N and S poles magnetized thereto so as to regularly alternate with each other in the circumferential direction at an equal pitch and is used as a rotation detection track, whereas the other track of the magnetic encoder, that is, the second magnetic encoder track 3 has a pair of the magnetic N and S poles magnetized to at least one location (or a plurality of locations) thereof for use in detection of a rotational reference position and is used as a Z-phase signal generating track.

Figure 6B:
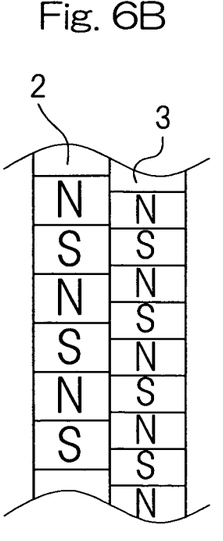

The magnetization pattern shown in FIG. 6B is such that the first magnetic encoder track 2 has the magnetic N and S poles magnetized thereto so as to regularly alternate with each other in the circumferential direction at an equal pitch and is used as a rotation detection track, whereas the second magnetic encoder track 3, although similarly having the magnetic N and S poles magnetized thereto so as to regularly alternate with each other in the circumferential direction at an equal pitch, has the number of the magnetic N and S poles which is different from that in the first magnetic encoder track and is used as another rotation detection track.

Figure 6C:
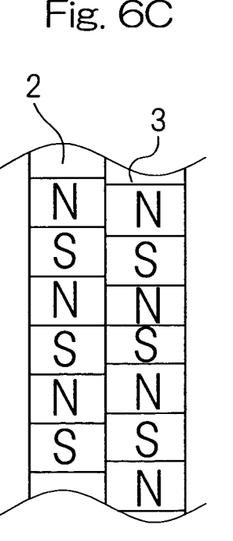

The magnetization pattern shown in FIG. 6C is such that while the first magnetic encoder track 2 has the magnetic N and S poles magnetized thereto so as to regularly alternate with each other in the circumferential direction at an equal pitch and is used as a rotation detection track, the second magnetic encoder track 3 has the same number of the magnetic N and S poles as those in the first magnetic encoder 2, which are magnetized thereto so as to regularly alternate with each other in the circumferential direction, but are displaced in phase relative to those in the first magnetic encoder track 2 and is used as another rotation detection track.

Figure 6D:
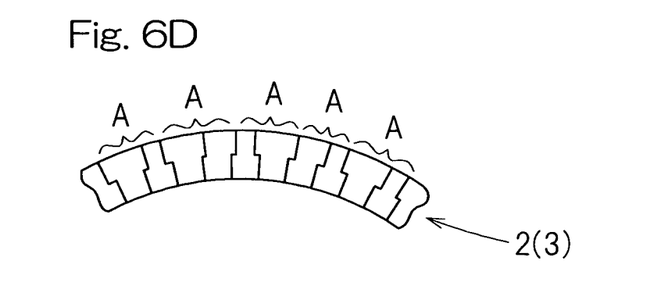

The magnetization pattern shown in FIG. 6D is such that in each of the magnetic pole pairs A magnetized to the magnetic encoder track 2 (or 3) in the axial type annular magnetic body, in order to form a magnetization pattern similar to that shown in and described with reference to FIG. 6C, the magnetic N pole and the magnetic S pole, forming each magnetic pole pair, have respective widths that are different from each other at radial halves of the corresponding magnetic encoder track.

Even at the time of magnetizing the magnetic encoder tracks to form any one of the magnetization patterns shown in and described with reference to FIGS. 6A to 6D, respectively, a highly accurate magnetization can be accomplished if such magnetizing method as hereinbefore described is employed.

It is to be noted that although in describing any one of the foregoing embodiments of the present invention, reference has been made to the indexed magnetization in which the magnetic poles are sequentially magnetized while the annular magnetic body is rotated, the present invention can be equally applied to an aggregate magnetization, in which the entire circumference of the annular magnetic body is magnetized with the alternating magnetic poles all at a time. In the case of the aggregate magnetization, it is quite often that a large amount of the magnetizing current is applied in the form of pulses of short duration and, therefore, the magnetic shielding mask may be employed in the form of an electric conductor made of a non-magnetic material. Since the magnetic field developed by the pulsed currents of short duration contain a large amount of high frequency components, eddy currents tend to be generated in the magnetic shielding mask made of an electroconductive material (such as, for example, copper, silver, gold or aluminum) and an effect to shield the passing magnetic field is therefore high. Also, if the magnetic shielding mask is made of a magnetic material and has its surface formed with a layer of a good electroconductive material by means of a plating technique, a magnetic field component of a high frequency can be shielded by eddy currents while a magnetic field component of a low frequency is shielded by the magnetic material, and, therefore, a further high magnetic shielding effect can be obtained. The structure utilizing the electric conductor of the non-magnetic material can be similarly applied to the case of the indexed magnetization and, specifically when the magnetization is effected with the pulsed current of short duration, a high shielding effect can be obtained.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 Annular magnetic body
2, 3 Magnetic encoder track
4 Core metal on the annular magnetic body
5 Magnetic shielding mask
10 Magnetizing head
11 Magnetizing yoke
11a, 11b End of the magnetizing yoke
12 Exciting coil
21 Spindle device
22 Motor
23 Positioning device
24 Magnetizing power source
25 Control device
26 Motor control unit

What is claimed is:

1. A method of obtaining a magnetic encoder, comprising:
providing an annular magnetic encoder body having a plurality of annular, unmagnetized magnetic encoder tracks integral therewith and juxtaposed relative to each other;
(a) covering, when one of the plurality of magnetic encoder tracks is magnetized, the other track with a magnetic shielding mask;
(b) rotating the annular magnetic encoder and magnetizing the one of the tracks by a magnetizing head, the magnetizing head comprising a magnetizing yoke and an exciting coil; and
repeating (a) and (b) for each of the plurality of magnetic encoder tracks, whereby a magnetic encoder having a plurality of magnetized encoder tracks with different patterns of magnetic poles or the same patterns of magnetic poles, but being displaced in phase, is obtained.

2. The method of obtaining the magnetic encoder as claimed in claim 1, in which the magnetic shielding mask is made of a ferromagnetic material.

3. The method of obtaining the magnetic encoder as claimed in claim 1, in which the magnetic shielding mask is made of a nonmagnetic electroconductive material.

4. The method of obtaining the magnetic encoder as claimed in claim 1, in which the magnetic shielding mask is of a structure including a layer of a ferromagnetic material and a layer of an electroconductive material.

5. The method of obtaining the magnetic encoder as claimed in claim 1, in which the magnetic shielding mask is an annular body capable of covering the other track in its entirety.

6. The method of obtaining the magnetic encoder as claimed in claim 1, in which the annular magnetic body is of a type, in which the plural tracks of the magnetic encoder are formed on one surface of an annular core metal and in which the magnetic shielding mask is disposed with a portion thereof neighboring the annular core metal.

7. The method of obtaining the magnetic encoder as claimed in claim 1, in which, of the plural tracks of the magnetic encoder, at least one track of the magnetic encoder is rendered to be a rotation detecting track by being magnetized with different magnetic poles alternately at an equal pitch.

8. The method of obtaining the magnetic encoder as claimed in claim 7, in which, of the plural tracks of the magnetic encoder, a different track of the magnetic encoder is magnetized at one circumferential location or a plurality of circumferential locations with magnetic poles for the detection of a rotation reference position, thereby rendering it to be the track for Z phase signal generation.

9. The method of obtaining the magnetic encoder as claimed in claim 7, in which, of the plural tracks of the magnetic encoder, a different track of the magnetic encoder is magnetized with magnetic poles different from each other alternately at an equal pitch in a number different from the number of the magnetic poles in the track for the rotation detection to thereby form the different track for the rotation detection.

10. The method of obtaining the magnetic encoder as claimed in claim 7, in which, of the plural tracks of the magnetic encoder, a different track of the magnetic encoder is magnetized with magnetic poles different from each other alternately in the same number as the number of the magnetic poles in the track for the rotation detection, but at a phase displaced from the phase of the magnetic poles in the track for the rotation detection to thereby form the different track for the rotation detection.

11. The method of obtaining the magnetic encoder as claimed in claim 1, in which a magnetic spacer is arranged between the neighboring magnetic encoder tracks in the annular magnetic body.

12. The method of obtaining the magnetic encoder as claimed in claim 1, in which the annular magnetic body is of a type in which the plural tracks of the magnetic encoder are formed on one surface of an annular core metal and a bend formed by bending is interposed between the neighboring magnetic encoder tracks in the annular magnetic body so as to protrude on that one surface of the annular core metal.

13. A method of obtaining a multipolar magnetic annular body, comprising:
providing an annular body having a plurality of annular, unmagnetized magnetic tracks to be magnetized integral therewith and juxtaposed relative to each other;
(a) covering, when one of the plurality of tracks to be magnetized is magnetized, the other track with a magnetic shielding mask;
(b) rotating the annular body and magnetizing the one of the tracks by a magnetizing head, the magnetizing head comprising a magnetizing yoke and an exciting coil, to thereby provide a multipole magnetized annular body; and
repeating (a) and (b) for each of the plurality of tracks to be magnetized, whereby a multipole magnetized annular body having a plurality of magnetized tracks with different patterns of magnetic poles or the same patterns of magnetic poles, but being displaced in phase, is obtained.

* * * * *